United States Patent
Muramatsu

(10) Patent No.: US 6,941,127 B2
(45) Date of Patent: Sep. 6, 2005

(54) PORTABLE TELEPHONE APPARATUS

(75) Inventor: Toshihiko Muramatsu, Toyooka-mura (JP)

(73) Assignee: Yamaha Corporation, Shizuoka-ken (JP)

( * ) Notice: Subject to any disclaimer, the term of this patent is extended or adjusted under 35 U.S.C. 154(b) by 590 days.

(21) Appl. No.: 10/021,588

(22) Filed: Dec. 12, 2001

(65) Prior Publication Data

US 2002/0115450 A1 Aug. 22, 2002

(30) Foreign Application Priority Data

Dec. 12, 2000 (JP) .................................... P.2000-377446
Dec. 12, 2000 (JP) .................................... P.2000-377448

(51) Int. Cl.$^7$ ........................................... H04M 11/04
(52) U.S. Cl. ............................. 455/404.2; 455/456.1; 455/457
(58) Field of Search ........................ 455/404.2, 456.1, 455/457, 466, 456.3, 456.6, 430, 566; 342/357.01, 357.06, 357.08, 357.09, 357.1, 357.12, 357.13

(56) References Cited

U.S. PATENT DOCUMENTS

| | | | | |
|---|---|---|---|---|
| 5,508,707 A | * | 4/1996 | LeBlanc et al. ............. | 342/457 |
| 5,579,535 A | * | 11/1996 | Orlen et al. ................ | 455/421 |
| 6,091,956 A | * | 7/2000 | Hollenberg ............... | 455/456.5 |
| 6,177,905 B1 | * | 1/2001 | Welch ..................... | 342/357.13 |
| 6,351,270 B1 | * | 2/2002 | Nishikawa et al. .......... | 715/717 |
| 6,442,263 B1 | * | 8/2002 | Beaton et al. .......... | 379/142.04 |
| 6,529,824 B1 | * | 3/2003 | Obradovich et al. ........ | 701/208 |
| 6,680,675 B1 | * | 1/2004 | Suzuki ....................... | 340/988 |
| 6,754,484 B1 | * | 6/2004 | Hiltunen et al. .......... | 455/412.1 |
| 6,771,969 B1 | * | 8/2004 | Chinoy et al. ............ | 455/456.1 |
| 2001/0049584 A1 | * | 12/2001 | Jones et al. ..................... | 702/3 |
| 2002/0019250 A1 | * | 2/2002 | Le-Faucher et al. ........ | 455/567 |
| 2002/0049049 A1 | * | 4/2002 | Sandahl et al. ............. | 455/414 |
| 2002/0177435 A1 | * | 11/2002 | Jenkins et al. .............. | 455/412 |

FOREIGN PATENT DOCUMENTS

| | | |
|---|---|---|
| JP | 06-120875 | 4/1994 |
| JP | 06-188819 | 7/1994 |
| JP | 8005394 | 1/1996 |
| JP | 11341546 | 12/1999 |
| JP | 2000-194993 | 7/2000 |
| JP | 2000-244673 | 9/2000 |

* cited by examiner

*Primary Examiner*—W. R. Young
*Assistant Examiner*—Dai Phuong
(74) *Attorney, Agent, or Firm*—Harness, Dickey & Pierce, P.L.C.

(57) ABSTRACT

A portable telephone apparatus comprises: an input unit; a RAM including a memory table for storing data used to specify a specific individual in correspondence with an arbitrary icon data, data used to specify a portable telephone apparatus owned by the specific individual, and positional information of the portable telephone apparatus; a display unit for displaying various data; and a CPU for executing a control operation that the CPU accesses the portable telephone apparatus corresponding to the arbitrary icon data, downloads the positional information of the portable telephone apparatus to automatically update the storage content of the memory table, and superimposes icon data as a position of the specific individual on a map displayed on the display unit based upon the positional information of the portable telephone apparatus which is owned by the specific individual in order to display thereon the icon data superimposed on the map.

12 Claims, 16 Drawing Sheets

FIG. 9

MEMORY TABLE

| | (1) C1<br>SORT OF ICON | (2) C2<br>NAME OF INDIVIDUAL | (3) C3<br>PORTABLE TELEPHONE NUMBER | (4) C4<br>LATITUDE | (5) C5<br>LONGITUDE | (6) C6<br>AZIMUTH |
|---|---|---|---|---|---|---|
| R1 | ICON 1 TOSHI | TOSHI MURAMATSU | 090-1234-0000 | 36.14N | 140.11E | 80° |
| R2 | ICON 2 MASA | MASA YAMADA | 090-1234-0001 | 31.25N | 130.53E | 120° |
| R3 | ICON 3 TAKA | TAKA NOMURA | 090-1234-0002 | 43.55N | 144.12E | 175° |
| ...... | ...... | ...... | ...... | ...... | ...... | ...... |
| R10 | ICON 10 TOM | TOM YAMADA | 090-1234-0010 | 38.67N | 135.64E | 40° |

FIG. 15

| | C1 | C2 | C3 | C4 | C5 | C6 | C7 | C8 |
|---|---|---|---|---|---|---|---|---|
| | (0) SORT OF ICON | (1) NAME | (2) PORTABLE TELEPHONE | (3) TARGET LATITUDE | (4) TARGET LONGITUDE | (5) TARGET DISTANCE | (6) PRESENT LATITUDE | (7) PRESENT LONGITUDE |
| R1 | ICON 1 | TOSHI | 090-1234-1111 | 37.45N | 135.00E | 100m | 38.57N | 135.54E |
| R2 | ICON 2 | MASA | 090-1234-1112 | 17.20N | 137.55E | 200m | 31.25N | 130.53E |
| R3 | ICON 3 | TAKA | 090-1234-1113 | 43.55N | 144.12E | 500m | 38.30N | 145.38E |
| R4 | ICON 4 | SUSAN | 090-1234-1114 | 40.53N | 142.00E | 1000m | 36.14N | 144.19E |

| TARGET LATITUDE | RE: DISTANCE/LONGITUDE ANGLE 10 SECONDS | RN: DISTANCE/LATITUDE ANGLE 10 SECONDS |
|---|---|---|
| 20 DEGREES | 290.7m | 307.5m |
| 25 DEGREES | 280.4m | 307.7m |
| 30 DEGREES | 268.0m | 307.9m |
| 35 DEGREES | 253.6m | 308.2m |
| 40 DEGREES | 237.2m | 308.4m |
| 45 DEGREES | 219.0m | 308.7m |

FIG. 19

| | C1 | C2 | C3 | C4 | C5 | C6 | C7 | C8 | C9 |
|---|---|---|---|---|---|---|---|---|---|
| | (0) SORT OF ICON | (1) NAME | (2) PORTABLE TELEPHONE | (3) TARGET LATITUDE | (4) TARGET LONGITUDE | (5) TARGET DISTANCE | (6) PRESENT LATITUDE | (7) PRESENT LONGITUDE | (8) TELEPHONE CALL RECEIVING MELODY |
| R1 | ICON 1 | TOSHI | 090-1234-1111 | 37.45N | 135.00E | 100m | 38.57N | 135.54E | MELODY A |
| R2 | ICON 2 | MASA | 090-1234-1112 | 17.20N | 137.55E | 200m | 31.25N | 130.53E | MELODY B |
| R3 | ICON 3 | TAKA | 090-1234-1113 | 43.55N | 144.12E | 500m | 38.30N | 145.38E | MELODY C |
| R4 | ICON 4 | SUSAN | 090-1234-1114 | 40.53N | 142.00E | 1000m | 36.14N | 144.19E | MELODY D |

PORTABLE TELEPHONE APPARATUS

BACKGROUND OF THE INVENTION

The present invention relates to a portable telephone apparatus. More specifically, the present invention relates to a portable telephone apparatus having a function capable of displaying positional information of a portable telephone apparatus owned by a telephone communication party. Generally, portable GPS apparatus and vehicle navigation systems display positional information of own stations on display units by using simple icon figures such as arrows and circles.

As previously described, in the related vehicle navigation systems and the related portable GPS apparatus, since icon figures indicative of positional information are fixedly used, a plurality of arbitrary positional information can be hardly displayed in such a manner that these can be discriminated.

Further, portable telephone apparatus could not have such a function capable of detecting positions of portable telephone apparatus owned by telephone communication counter parties, and capable of grasping traveling conditions of these portable telephone apparatus.

In such a related portable telephone apparatus, since this telephone apparatus is not equipped with a function capable of grasping a traveling condition of another portable telephone apparatus owned by a telephone communication counter party, for example, when the person using this related portable telephone apparatus has a plan to meet a customer at a specific place, this person cannot know where this customer approaches, namely the telephone communication counter party approaches.

Further, there are other problems. That is, this person cannot know whether or not the customer could arrive at the above-described meeting place first of all. Furthermore, this person cannot know as to how far the customer approaches the own present position.

SUMMARY OF THE INVENTION

The present invention has been made to solve these problems, and therefore, has an object to provide a portable telephone apparatus capable of displaying positional information of a plurality of portable telephone apparatus in such a manner that these can be discriminated by way of arbitrary icon figures which have been previously registered.

The present invention has been made to solve these problems, and therefore, has an object to provide a portable telephone apparatus capable of grasping a move condition of a portable telephone apparatus owned by a telephone communication counter party.

In order to solve the aforesaid object, the invention is characterized by having the following arrangement.

(1) A portable communication terminal capable of detecting a position of the portable communication terminal by using a Global Positioning System, the portable communication terminal comprising:

a register unit which registers data to specify at least one other portable communication terminal whose position is to be detected;

a storage unit which stores at least one musical data;

a detector which detects whether or not the other portable communication terminal is located within a predetermined range previously set by receiving the positional information indicating a position of the other portable communication terminal corresponding to the registered data; and a reproducing unit which reads out the musical data stored in the storage unit and reproduces music based on the read musical data when the detector detects that the other portable communication terminal is located within the predetermined range.

(2) The portable communication terminal according to (1) further comprising:

a display;

a display controller which displays a map in vicinity of a target position on the display and displays a mark representing the position of the other portable communication terminal so as to be superposed on the map based on the received positional information.

(3) The portable communication terminal according to (2), wherein the mark is an icon, and the register unit registers the icon therein in correspondence with the other portable communication terminal.

(4) The portable communication terminal according to (3), wherein the icons registered in the register unit are different each other for every corresponding other portable communication terminal.

(5) The portable communication terminal according to (1), wherein the portable communication terminal is a portable telephone apparatus, and the data, registered in the register unit, for specifying the at least one other portable telephone apparatus is a telephone number of the other portable telephone apparatus.

(6) The portable communication terminal according to (1), wherein a plurality of the musical data are stored in the storage unit, and the register unit is capable of registering the plurality of the musical data which are different each other for every corresponding other portable communication terminal.

(7) The portable communication terminal according to (1), wherein the predetermined range is set as a distance from a predetermined target position.

(8) A portable telephone apparatus for acquiring positional information of the portable telephone apparatus by using a Global Positioning System, the portable telephone apparatus comprising:

an input unit which inputs various sorts of data which include first data for specifying a specific individual, second data for specifying a portable telephone apparatus owned by the specific individual, target position data, and target distance data for designating a target range by using the target position as a reference;

a first storage unit including a positional information table which stores thereinto the first data, the second data, the target position data, the target distance data, and present positional information indicative of a present position of the portable telephone apparatus;

a second storage unit which stores thereinto a distance/displacement angle table, various sorts of programs, and fixed data, the distance/displacement angle table including an arc distance with respect to a longitude displacement angle and an arc distance with respect to a latitude displacement angle at each of latitude positions;

a musical piece reproducing unit which reproduces a musical piece; and a controller which acquires positional information indicative of a present position of the portable telephone apparatus as a communication counter station, updates the present positional information of the positional information table based upon the acquired positional information, and calculates a first distance between the present position of the communication counter station and a target position from the acquired present positional information, the target position data, and the distance/displacement angle data based upon the arc distance with respect to the longitude displacement angle and the arc distance with respect to the latitude displacement angle at latitude in the vicinity of the target position, wherein the controller compares the first distance with a second distance indicated by the target distance data, and drives the musical piece reproducing unit when the calculated first distance is shorter than, or equal to the second distance.

(9) A portable communication terminal capable of detecting a position of the portable communication terminal by using a Global Positioning System, the portable communication terminal comprising:

a input unit which inputs first data for specifying a specific individual and second data for specifying a portable communication terminal owned by the specific individual in correspondence with icon data;

a storage unit which stores the inputted first and second data and positional information of the portable communication terminal owned by the specific individual in correspondence with the icon data;

a display; and a controller which accesses the portable communication terminal corresponding to the icon data, downloads the positional information of the portable communication terminal corresponding to the icon data, automatically updates the positional information of the portable communication terminal corresponding to the icon data which is stored in the storage unit, and displays an icon based on the icon data so as to be superposed on a map displayed on the display.

(10) The portable communication terminal according to (9), wherein the portable communication terminal is a portable telephone apparatus, the second data is a telephone number, and when the icon displayed on the display is selected, the controller reads out the telephone number corresponding to the selected icon data from the storage unit and executes a telephone calling process operation based on the read telephone number.

(11) The portable communication terminal according to (9), wherein the map displayed on the display is provided based on map information downloaded through a based station according to the downloaded positional information of the portable communication terminal.

(12) The portable communication terminal according to (9) further comprising:

an azimuth measuring unit for measuring an azimuth of the specific individual, wherein an inclination angle of the icon character on the map is controlled based on the measured azimuth.

(13) A method of controlling a portable communication terminal which is capable of detecting a position of the portable communication terminal by using a Global Positioning System, the method comprising the steps of:

registering data for specifying at least one other portable communication terminal whose position is to be detected;

storing at least one musical data;

receiving the positional information indicating a position of the other portable communication terminal corresponding to the registered data;

detecting whether of not the other portable communication terminal is located within a predetermined range previously set based on the received positional information; and reading out the musical data and reproducing music based on the read musical data when the other portable communication terminal is located within the predetermined range.

(14) A method of controlling a portable telephone apparatus for acquiring positional information of the portable telephone apparatus by using a Global Positioning System, the method comprising the steps of:

inputting various sorts of data which include first data for specifying a specific individual, second data for specifying a portable telephone apparatus owned by the specific individual, target position data, and target distance data for designating a target range by using the target position as a reference;

storing, in a positional information table, the first data, the second data, the target position data, and the target distance data;

storing a distance/displacement angle table, various sorts of programs, and fixed data, the distance/displacement angle table including an arc distance with respect to a longitude displacement angle and an arc distance with respect to a latitude displacement angle at each of latitude position;

acquiring positional information indicative of a present position of the portable telephone apparatus as a communication counter station;

storing and updating, in the positional information table, present positional information indicative of a present position of the portable telephone apparatus based upon the acquired positional information;

calculating a first distance between the present position of the communication counter station and a target position from the acquired present positional information, the target position data, and the distance/displacement angle data based upon the arc distance with respect the longitude displacement angle and the arc distance with respect to the latitude displacement angle at latitude in the vicinity of the target position;

comparing the first distance with a second distance indicated by the target distance data; and reproducing a musical piece when the calculated first distance is shorter than, or equal to the second distance.

(15) A method of controlling a portable communication terminal capable of detecting a position of the portable communication terminal by using a Global Positioning System, the method comprising the steps of:

inputting first data for specifying a specific individual and second data for specifying a portable communication terminal owned by the specific individual in correspondence with icon data;

storing the inputted first and second data and positional information of the portable communication terminal owned by the specific individual in correspondence with the icon data;

accessing the portable communication terminal corresponding to the icon data;

downloading the positional information of the portable communication terminal corresponding to the icon data;

automatically updating the positional information of the portable communication terminal corresponding to the stored icon data; and displaying an icon based on the icon data so as to be superposed on a map displayed on a display.

(16) A computer program product including instructions, wherein the instruction, when executed by a computer provided in a portable communication terminal capable of detecting a position of the portable communication terminal by using a Global Positioning System, cause the portable communication terminal to perform the steps of:

registering data for specifying at least one other portable communication terminal whose position is to be detected;

storing at least one musical data;

receiving the positional information indicating a position of the other portable communication terminal corresponding to the registered data;

detecting whether of not the other portable communication terminal is located within a predetermined range previously set based on the received positional information; and reading out the musical data and reproducing music based on the read musical data when the other portable communication terminal is located within the predetermined range.

(17) A computer program product including instructions, wherein the instruction, when executed by a computer provided in a portable telephone apparatus for acquiring positional information of the portable telephone apparatus by using a Global Positioning System, cause the portable telephone apparatus to perform the steps of:

inputting various sorts of data which include first data for specifying a specific individual, second data for specifying a portable telephone apparatus owned by the specific individual, target position data, and target distance data for designating a target range by using the target position as a reference;

storing, in a positional information table, the first data, the second data, the target position data, and the target distance data;

storing a distance/displacement angle table, various sorts of programs, and fixed data, the distance/displacement angle table including an arc distance with respect to a longitude displacement angle and an arc distance with respect to a latitude displacement angle at each of latitude position;

acquiring positional information indicative of a present position of the portable telephone apparatus as a communication counter station;

storing and updating, in the positional information table, present positional information indicative of a present position of the portable telephone apparatus based upon the acquired positional information;

calculating a first distance between the present position of the communication counter station and a target position from the acquired present positional information, the target position data, and the distance/displacement angle data based upon the arc distance with respect the longitude displacement angle and the arc distance with respect to the latitude displacement angle at latitude in the vicinity of the target position;

comparing the first distance with a second distance indicated by the target distance data; and reproducing a musical piece when the calculated first distance is shorter than, or equal to the second distance.

(18) A computer program product including instructions, wherein the instruction, when executed by a computer provided in a portable communication terminal capable of detecting a position of the portable communication terminal by using a Global Positioning System, cause the portable communication terminal to perform the steps of:

inputting first data for specifying a specific individual and second data for specifying a portable communication terminal owned by the specific individual in correspondence with icon data;

storing the inputted first and second data and positional information of the portable communication terminal owned by the specific individual in correspondence with the icon data;

accessing the portable communication terminal corresponding to the icon data;

downloading the positional information of the portable communication terminal corresponding to the icon data;

automatically updating the positional information of the portable communication terminal corresponding to the stored icon data; and displaying an icon based on the icon data so as to be superposed on a map displayed on a display.

BRIEF DESCRIPTION OF THE INVENTION

FIG. 9 is an explanatory diagram for indicating an example of setting a memory table of a RAM employed in the portable telephone apparatus according to the first embodiment, shown in FIG. 2.

FIG. 15 is an explanatory diagram for indicating a setting example of a positional information table stored in an RAM of the portable telephone apparatus according to the second embodiment of the present invention, shown in FIG. 11.

FIG. 19 is an explanatory diagram for indicating a setting example of a positional information table which includes a various kinds of telephone call receiving melodies and is stored in an RAM of the portable telephone apparatus according to the second embodiment of the present invention, shown in FIG. 11.

DETAILED DESCRIPTION OF PREFERRED EMBODIMENTS

Referring now to drawings, various embodiments of the present invention will be described.

First Embodiment

Figure 1:
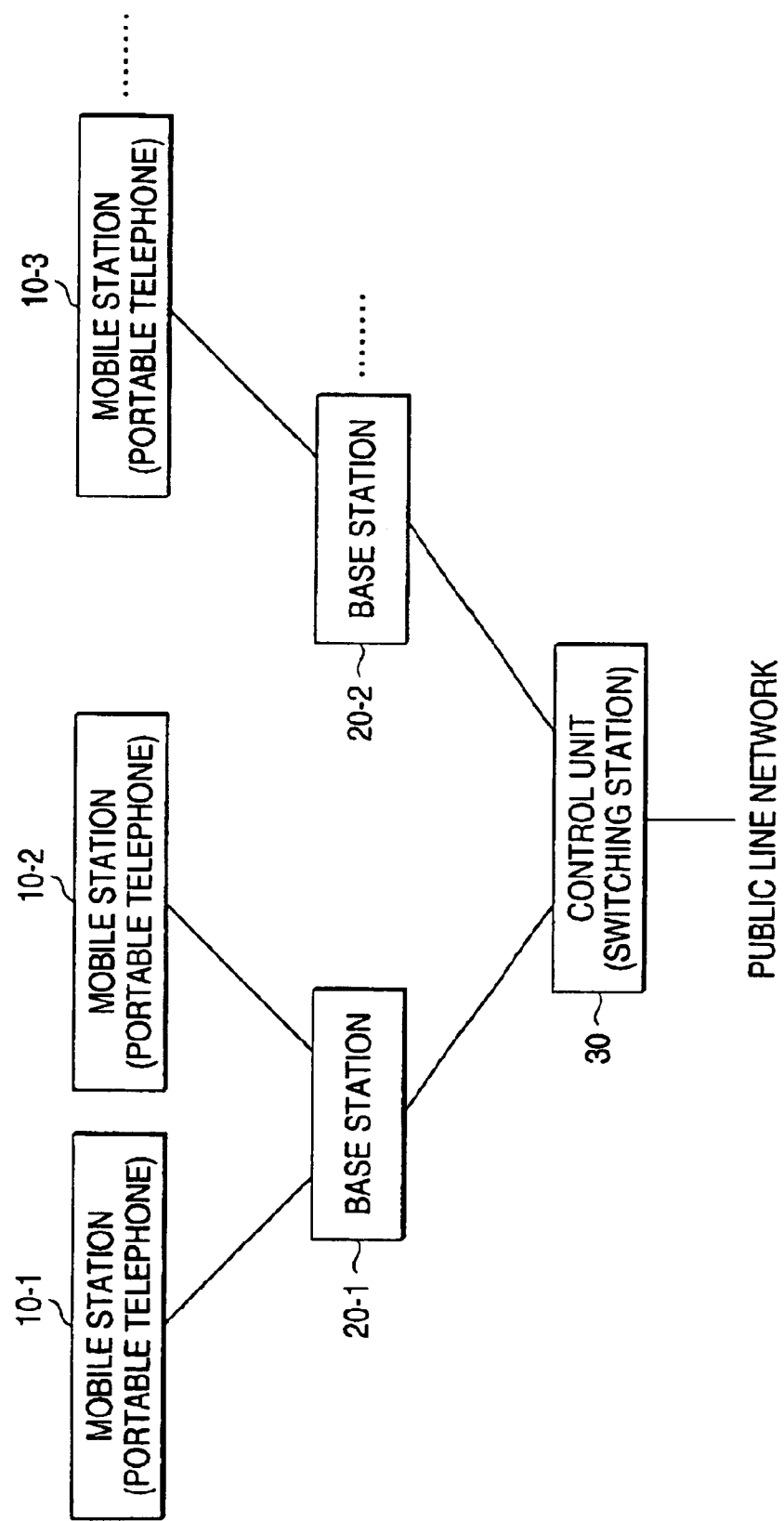
FIG. 1 is a block diagram for indicating an arrangement of a mobile communication system according to the present invention.

FIG. 1 represents a structure of a mobile communication system according to a first embodiment of the present invention. In this drawing, the mobile communication system according to the present invention is provided with a plurality of mobile stations 10-1, 10-2, 10-3, - - - ; a plurality of base stations 20-1, 20-2, - - - , which are installed every predetermined area; and a control station 30 which is connected to a public line network, and controls the base stations 20-1, 20-2, - - - , in a united manner. In this case, the mobile stations 10-1, 10-2, 10-3, - - - , correspond to portable telephone apparatus, and the base stations 20-1, 20-2, - - - , have another function as GPS (Global Positioning System) base stations. In this case, a GPS base station may be realized as either a base station (operated by D-GPS system) or another base station (operated by E-GPS system). The base station of the D-GPS system transmits error correction data used to correct an error contained in a measuring calculation executed by a mobile station. The base station of the E-GPS system performs a measuring calculation based upon raw data (unprocessed data) transmitted from GPS satellites, which is received from a mobile station, and then, transmits this calculation result to the mobile station. In the case that a mobile station can solely calculate a correct position to some extent, such a GPS base station is not required.

Figure 2:
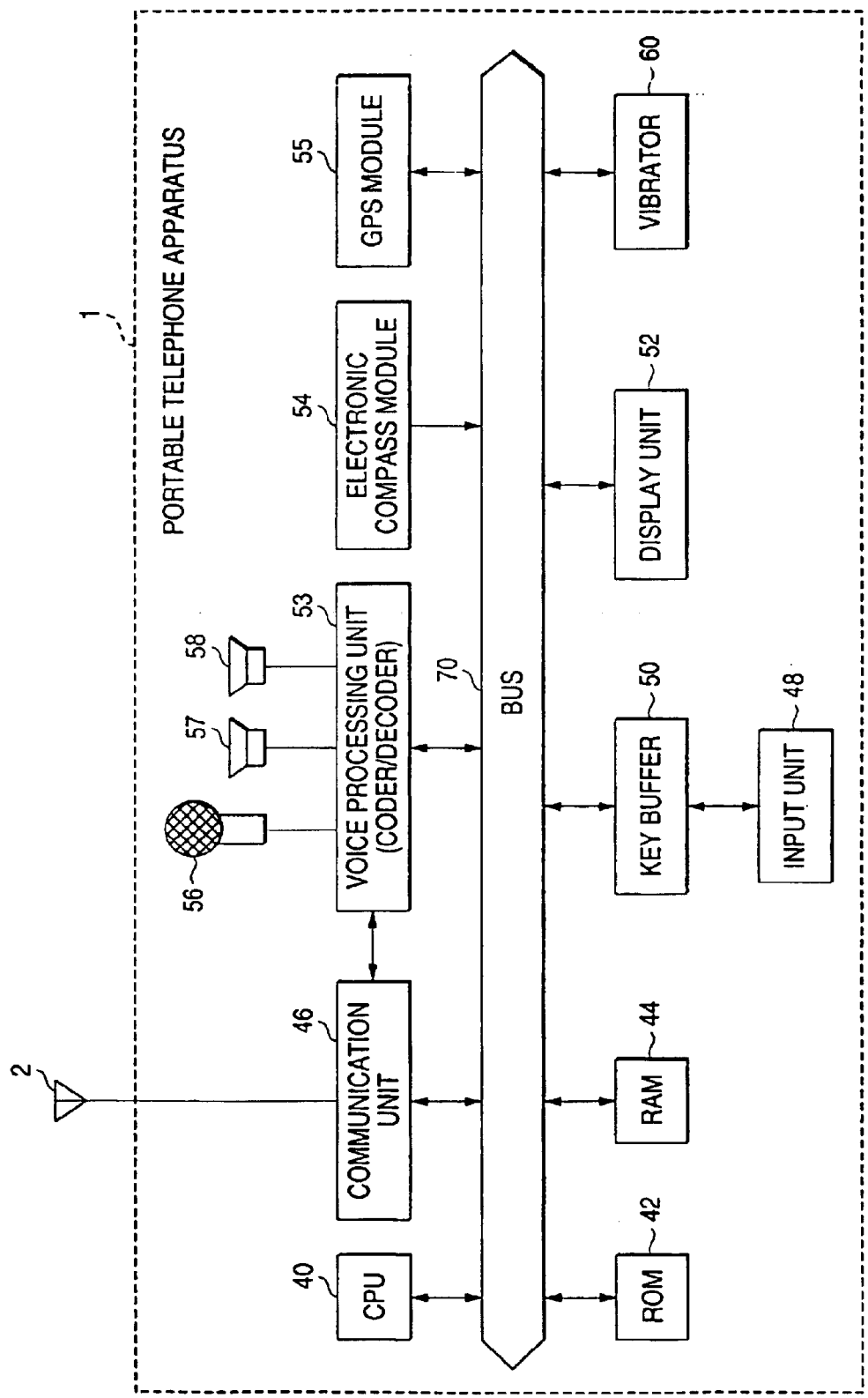
FIG. 2 is a block diagram for showing an arrangement of a portable telephone apparatus according to a first embodiment of the present invention.

Next, FIG. 2 shows an electric arrangement of a portable telephone apparatus 1 provided as any one of the mobile stations 10-1, 10-2, 10-3, - - - , shown in FIG. 1. In this drawing, the portable telephone apparatus 1 includes a CPU (Central Processing Unit) 40, a ROM (Read-Only Memory) 42, a RAM (Random Access Memory) 44, a communication unit 46, an input unit 48, a key buffer 50, and a display unit 52. The CPU 40 executes both a telephone function program, and other programs so as to control various units of the portable telephone apparatus 1. The ROM 42 previously stores thereinto various sorts of programs, and fixed data such as musical piece data. The RAM 44 is a readable/writable storage element. The communication unit 46 transmits and receives data via an antenna 2 to and from an externally provided communication appliance. The input unit 48 is provided with various sorts of keys such as a ten-numeral entry key. The key buffer 50 temporarily stores thereinto key setting data entered from the input unit 48. The display unit 52 displays thereon various sorts of data.

In this ROM 42, these items are stored: various sorts of telephone function programs and a control program, which are executed by the CPU 40 during transmission operation and/or during reception operation; musical piece data which is preset in order to notify a telephone call; icon data indicative of icon figures (icon characters) which are used to display positional information of individuals which constitute owners of portable telephone apparatus corresponding to communication counter parties; and other various sorts of fixed data.

The following memory table is set to the RAM 44, namely, this memory table stores data (for example, name) used to specify a specific individual in correspondence with arbitrary icon data; data (for example, telephone number) for specifying a portable telephone apparatus owned by this specific individual; and positional information (for example, GPS positional information) of this portable telephone apparatus. In this RAM 44, an arbitrary user setting data storage area, and a work area of the CPU 40 are set to this RAM 44.

The communication unit 46 has a function capable of demodulating a signal received by the antenna 2, and another function capable of modulating a signal to be transmitted and for transmitting the modulated signal.

Figure 3:
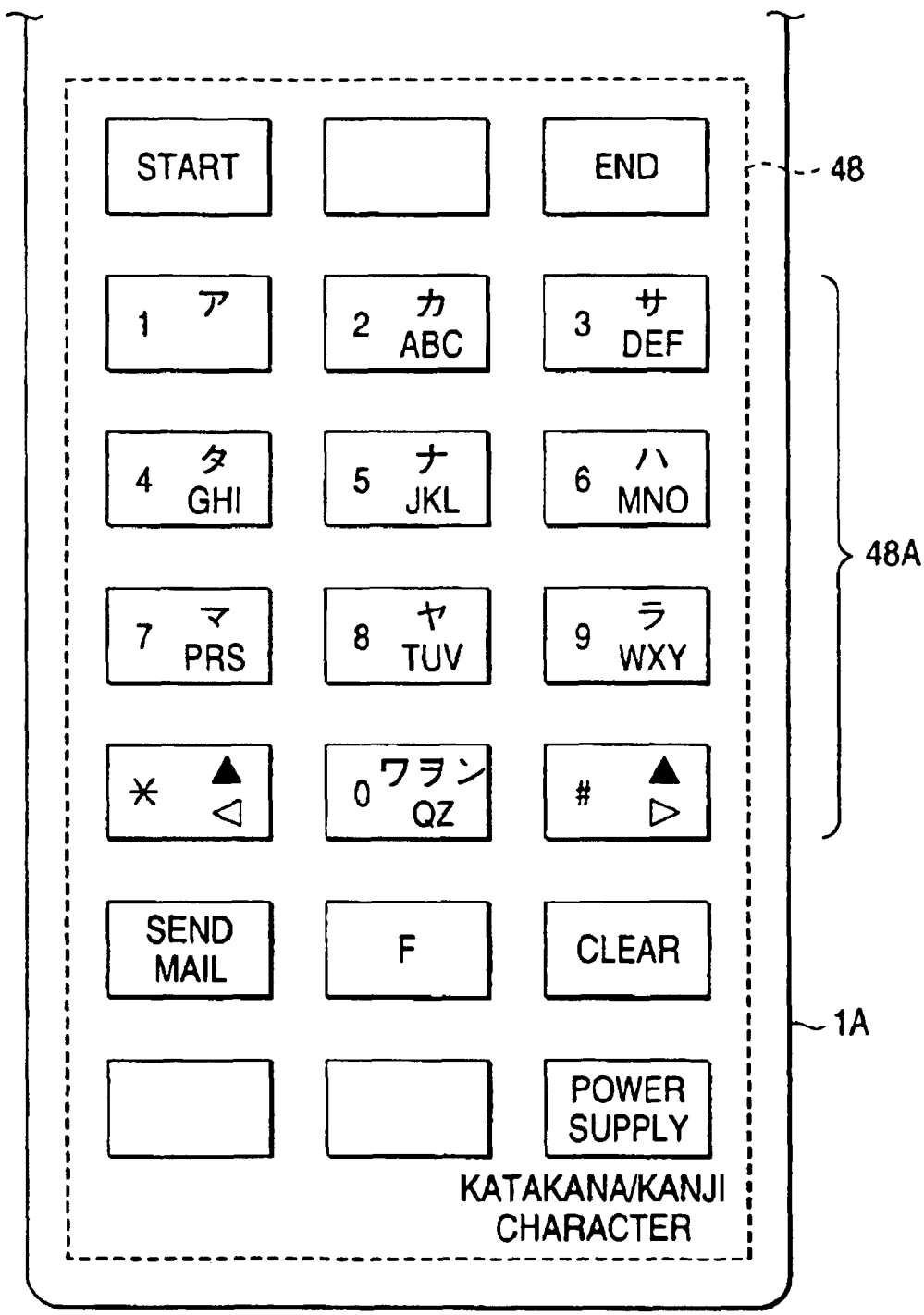
FIG. 3 is an explanatory diagram for indicating a key arrangement provided in an input unit of the portable telephone apparatus according to the first and second embodiments of the present invention, shown in FIGS. 2 and 11.

As shown in FIG. 3, the input unit 48 provided on a main body 1A of the portable telephone apparatus 1 is equipped with a ten-numeral entry key 48A, an F (function) key, a power supply key, a clear key, and the like. The ten-numeral entry key 48A is constituted by code keys such as a starting key (corresponding to telephone communication key) used when a telephone call is received, an end key used when a telephone communication is ended, a numeral key (commonly operable as character key), a # key (commonly operable as cursor key), and also a * key (commonly operable as cursor key). The F (function) key is used when various sorts of functions are set. The power supply key is used to turn ON/OFF a power supply. The clear key is used to release various setting conditions.

The display unit 52 displays thereon map information which is downloaded from the GPS base stations 20-1, 20-2, - - - ,in the portable telephone apparatus 1; icon data indicative of a position of a specific individual who owns a portable telephone apparatus; character information of a document which is formed when an electronic mail is transmitted; various sorts of data which contain contents of various sorts of menus; and furthermore, detailed contents thereof.

The portable telephone apparatus 1 is equipped with a voice processing unit (CODER/DECODER) 53, an electronic compass module 54, a GPS module 55, a microphone 56, a telephone communication receiving speaker 57, a telephone call receiving speaker 58, and a vibrator 60.

The voice processing unit 53 is constituted by a coding unit (CODER), and a decoding unit (DECODER). The voice processing unit 53 decodes a voice (speech) signal which is demodulated by the communication unit 46 so as to output the decoded voice signal to the telephone communication receiving speaker 57. The voice processing unit 53 compresses and codes a voice signal for a telephone communication transmitting purpose, which is entered from the microphone 56, and then, outputs the compressed/coded voice signal to the communication unit 46. When a telephone call is received, musical piece data is read out from the ROM 42, and is processed by the voice processing unit 53. As a result, a musical piece as a telephone call receiving melody is reproduced by the telephone call receiving speaker 58.

The electronic compass module 54 detects azimuth of a portable telephone apparatus 1 of the own station, for example, every time a preselected time duration has passed, and then, stores this detected azimuth data into a predetermined memory area so as to update the stored azimuth data by this detected azimuth data. Alternatively, the azimuth detection may be continuously carried out.

The GPS module 55 receives position measuring electromagnetic waves from a plurality (more than three) of satellites (GPS satellites), and then, transmits these raw data (unprocessed data) to a GPS base station, and receives a result of measuring calculations from the GPS base station so as to be stored in a predetermined are of the RAM 44 for update operation (in the case of E-GPS system).

The CPU 40, the ROM 42, the RAM 44, the communication unit 46, the input unit 48 via the key buffer 50, the display unit 52, the voice processing unit 53, the electronic compass module 54, the GPS module 55, and the vibrator 60 are connected to a bus 70 so as to communicate each other.

In this case, the CPU 40 corresponds to a controller of the present invention, the RAM 44 corresponds to a storage unit of the present invention, the input unit 48 corresponds to an input unit of the present invention, and the display unit 52 corresponds to a display unit of the present invention.

Figure 4:
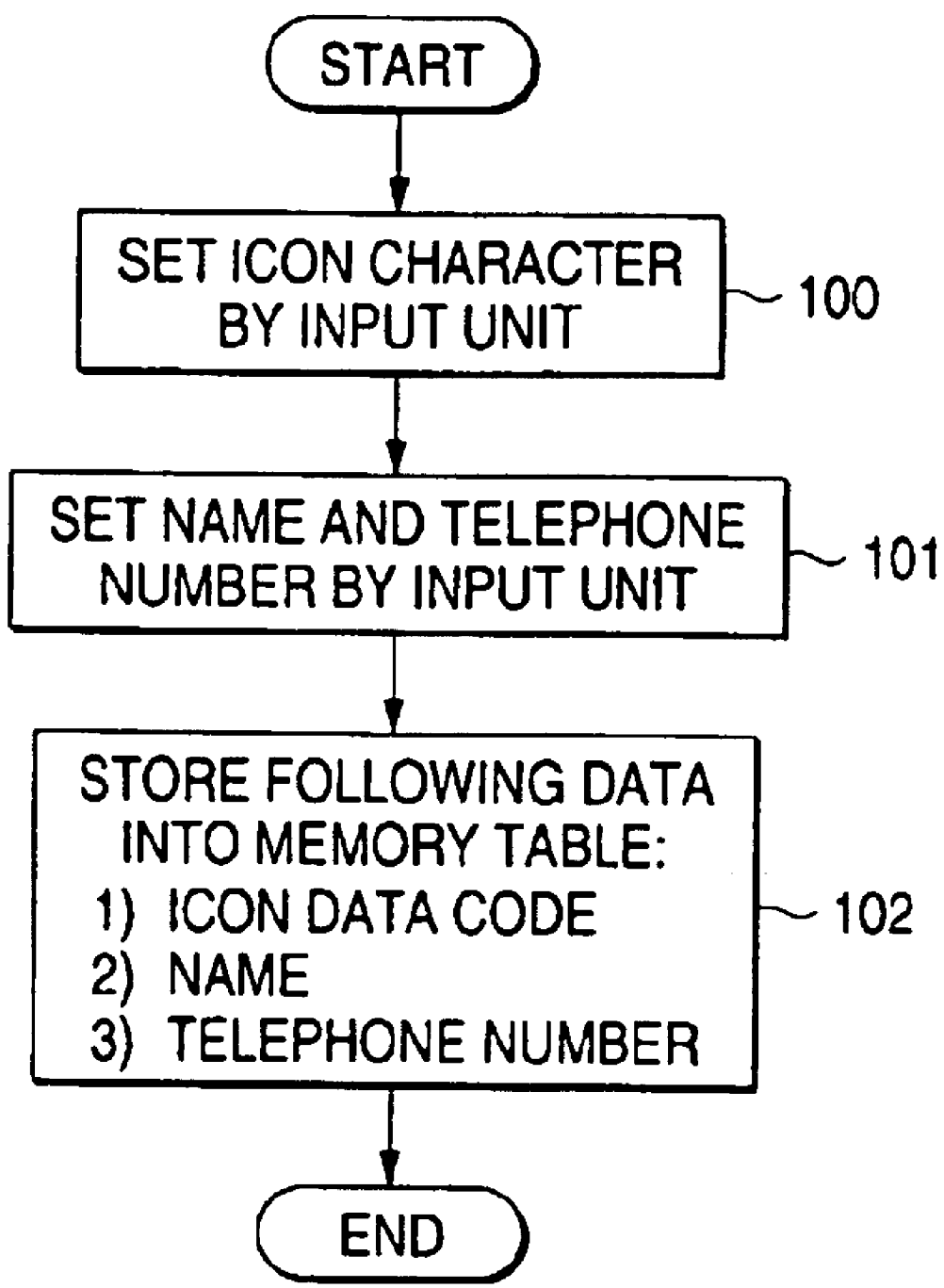
FIG. 4 is a flow chart for explaining a content of an initial setting process operation of a memory table, executed by a CPU employed in the portable telephone apparatus according to the first embodiment of the present invention, shown in FIG. 2.

Next, operations of the portable telephone apparatus 1 according to the present invention, shown in FIG. 2, will now be explained with reference to flow charts of FIG. 4 to FIG. 7. FIG. 4 indicates a content of an initial setting process operation of the memory table stored in the RAM 44. In the drawing, icon data indicative of icon characters are read out from the ROM 42 by way of a key operation by the input unit 48, and then, this read icon data are displayed on the display unit 52 under control of the CPU 40. Then, such data used to identify a specific individual who owns the portable telephone apparatus 1 with respect to the respective icon characters are set to icon characters (indicated in FIG. 8) which are displayed in correspondence with icon codes (step 100). The above-explained specific data, for instance, names and nick names are set by way of a key operation of the input unit 48. In FIG. 8, it is so assumed that the icon codes designate an icon 1, an icon 2, an icon 3, - - - , and an icon 10.

Next, the below-explained respective data are set by operating keys of the input unit 48 under control of the CPU 40, namely a name functioning as the data for specifying the specific individual corresponding to the icon data; and a telephone number functioning as data for specifying the portable telephone apparatus owned by this specified individual (step 101).

At a step 102, such icon data which is defined in correspondence with the specific individual set at the previous step 100 is stored into a specific memory area of the RAM 44.

As indicated in FIG. 9, an icon code used to specify the above-explained icon data, a name of a specific individual corresponding to the icon data specified by the icon code, and the telephone number of the portable telephone apparatus 1 owned by this specific individual are stored into the memory table set to the RAM 44, respectively. It should be noted that at this initial setting stage, the respective positional information as to latitude, longitude, and azimuth have not yet been stored.

Figure 5:
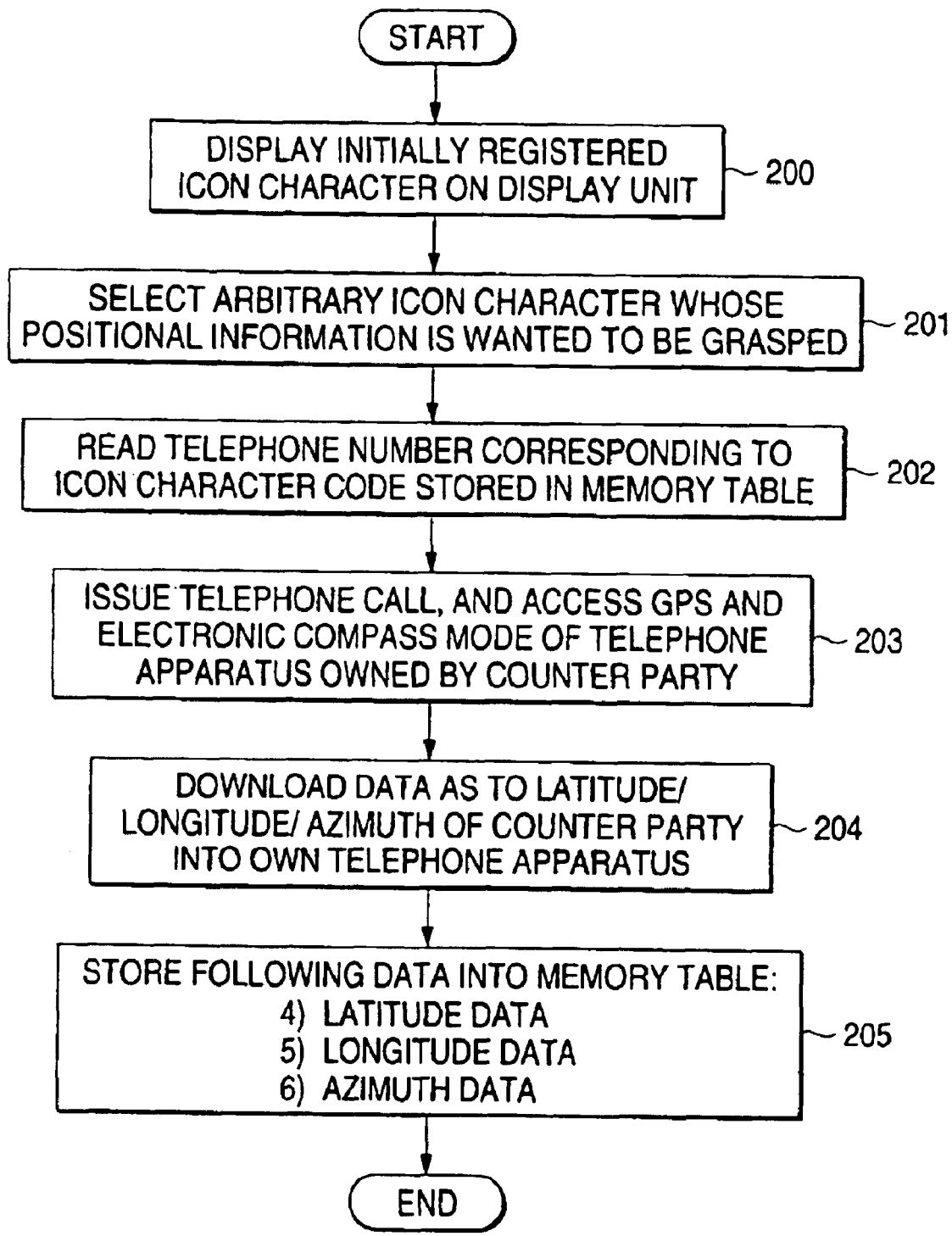
FIG. 5 is a flow chart for explaining a content of a positional information setting process operation of the memory table, executed by the CPU employed in the portable telephone apparatus according to the first embodiment of the present invention, shown in FIG. 2.

Next, FIG. 5 indicates a content of process operation executed when positional information is set to the memory table. In this drawing, the icon character which has been initially set in the initial setting operation shown in FIG. 4 is displayed on the display unit 52 (step 200).

Next, an arbitrary icon character corresponding to a specific individual whose positional information is wanted is selected by manipulating the cursor key of the input unit 48 (step 201).

As a consequence, a telephone number corresponding to the icon data code of the selected icon character is read out from the memory table of the RAM 44 under control of the CPU 40 (step 202), and then, the CPU 40 issues a telephone call of this telephone number so as to access the electronic compass module 54 and the GPS module 55 of the portable telephone apparatus owned by a specific individual corresponding to the selected icon character (step 203).

Figure 7:
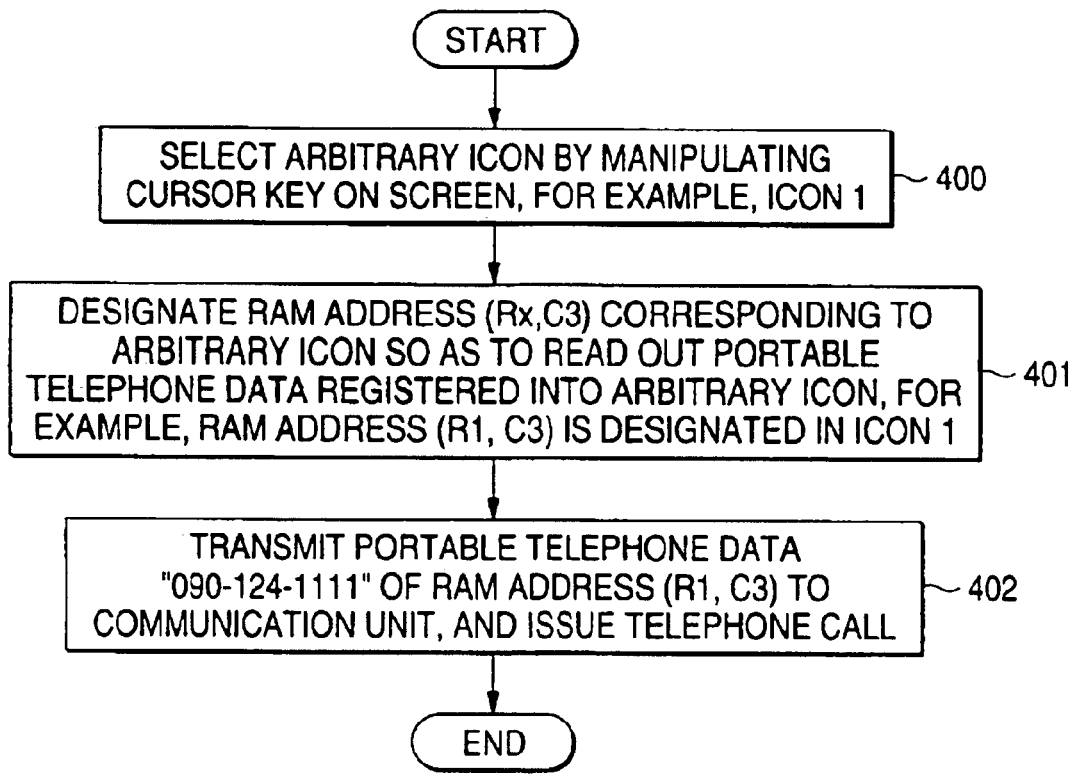
FIG. 7 is a flow chart for explaining a content of a telephone calling process operation of the memory table, executed by the CPU employed in the portable telephone apparatus according to the first embodiment of the present invention, shown in FIG. 2.
Figure 8:
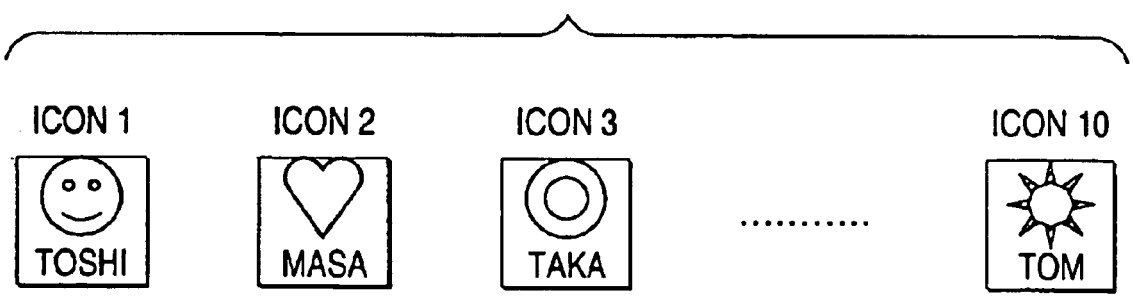
FIG. 8 is an explanatory diagram for describing an example of setting an icon data code and an icon character.

Next, referring now to a flow chart of FIG. 7, a description is made of such a call issuing process operation that while an arbitrary icon character is selected from a plurality of icon characters displayed on the display screen of the display unit 52, a telephone call is sent to a portable telephone apparatus which is owned by a specific individual corresponding to the selected icon character. In this drawing, for example, it is so assumed that an icon character corresponding to the icon data code shown in FIG. 8 is displayed on the display screen of the display unit 25. In this case, an arbitrary icon character is selected by manipulating the cursor key of the input unit 48 (step 400).

Subsequently, a RAM address (RX, C3) corresponding to the selected arbitrary icon data code is designated, and data as to a telephone number (portable telephone number) of the relevant portable telephone apparatus is read out from the table of the RAM 44 shown in FIG. 9 (step 401). For instance, it is so assumed that such an icon character whose icon data is "icon 1" is selected. In this case, since the icon data code is "icon 1", a RAM address to be designated becomes (R1, C3). Then, at a step 402, the CPU 40 sends out telephone number data "090-1234-1111" of the relevant portable telephone apparatus based upon the RAM address (R1, C3) in the memory table of the RAM 44 to the communication unit 46, and then, issues a telephone call.

Returning back to FIG. 5, the setting process operation of the positional information will now be explained. After the CPU 40 has accessed the electronic compass module 54 and the GPS module 55 of the portable telephone apparatus owned by the specific individual corresponding to the icon character selected at the step 203, the setting process operation is advanced to a step 204, the positional information of the portable telephone apparatus 1 owned by the accessed communication counter party, namely the respective data of longitude, latitude, and azimuth is downloaded to the portable telephone apparatus 1 of the own station (step 204).

Next, the respective data as to the longitude, the latitude, and the azimuth of the portable telephone apparatus 1 owned by the communication counter party, which are downloaded, are stored in the memory table of the RAM 44, as shown in FIG. 9 (step 205).

Figure 6:
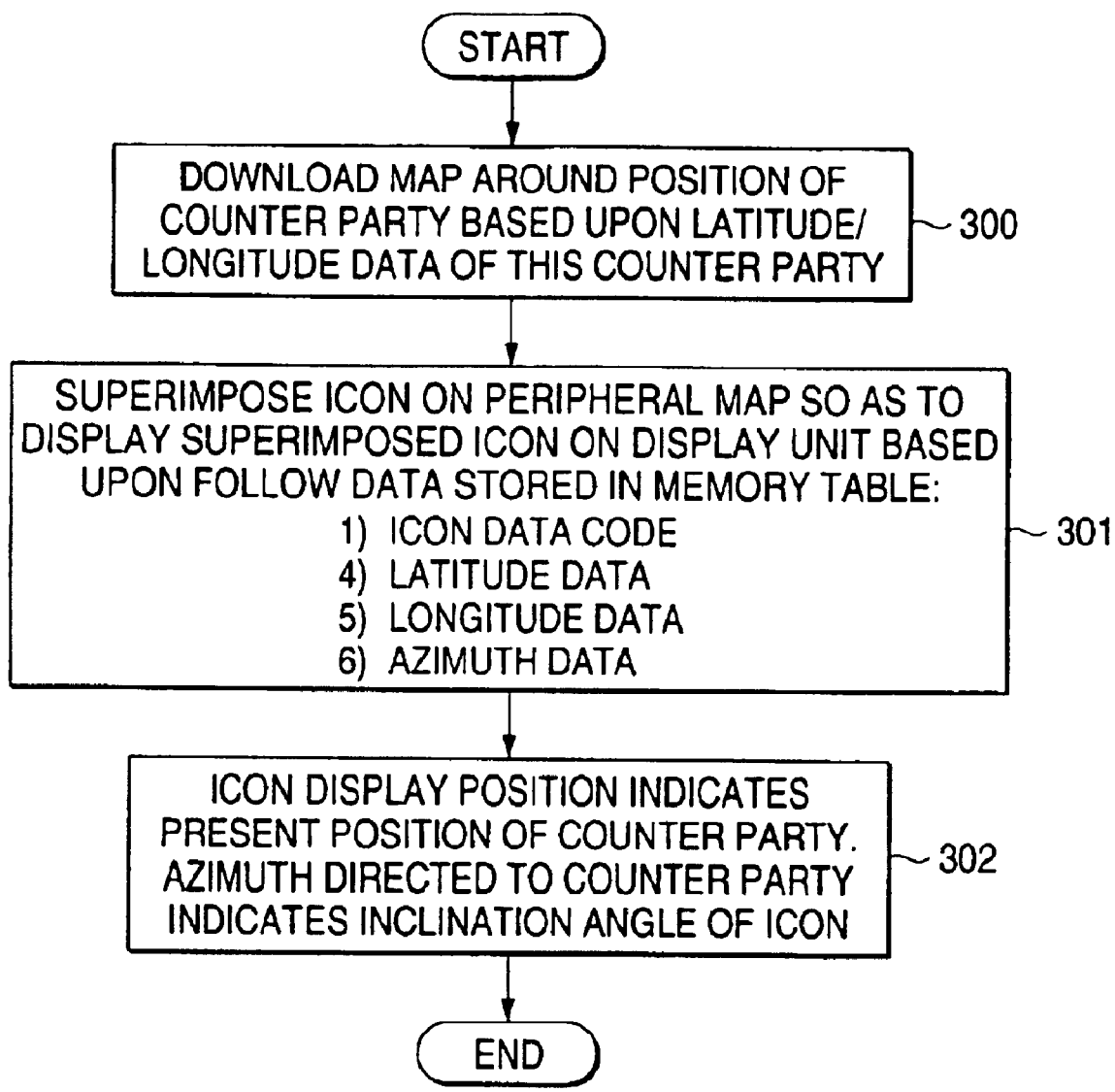
FIG. 6 is a flow chart for explaining a content of a display process operation as to a map and an icon executed by the CPU employed in the portable telephone apparatus according to the first embodiment of the present invention, shown in FIG. 2.

Referring now to a flow chart shown in FIG. 6, a description is made of such a display process operation that a position of a portable telephone apparatus owned by a specific individual, namely, a position of the specific individual is displayed on a map, while this position is superimposed by an icon character on the display unit 52. In this drawing, the CPU 40 downloads from the GPS base station (otherwise, center which may provide information such as map), a map in the vicinity of the position of the portable telephone apparatus owned by the specific individual (communication counter party) based upon the positional information (respective data of latitude, longitude, and azimuth) of the portable telephone apparatus owned by the specific individual who constitutes the communication counter party set in the memory table of the RAM 44 (step 300).

Figure 10:
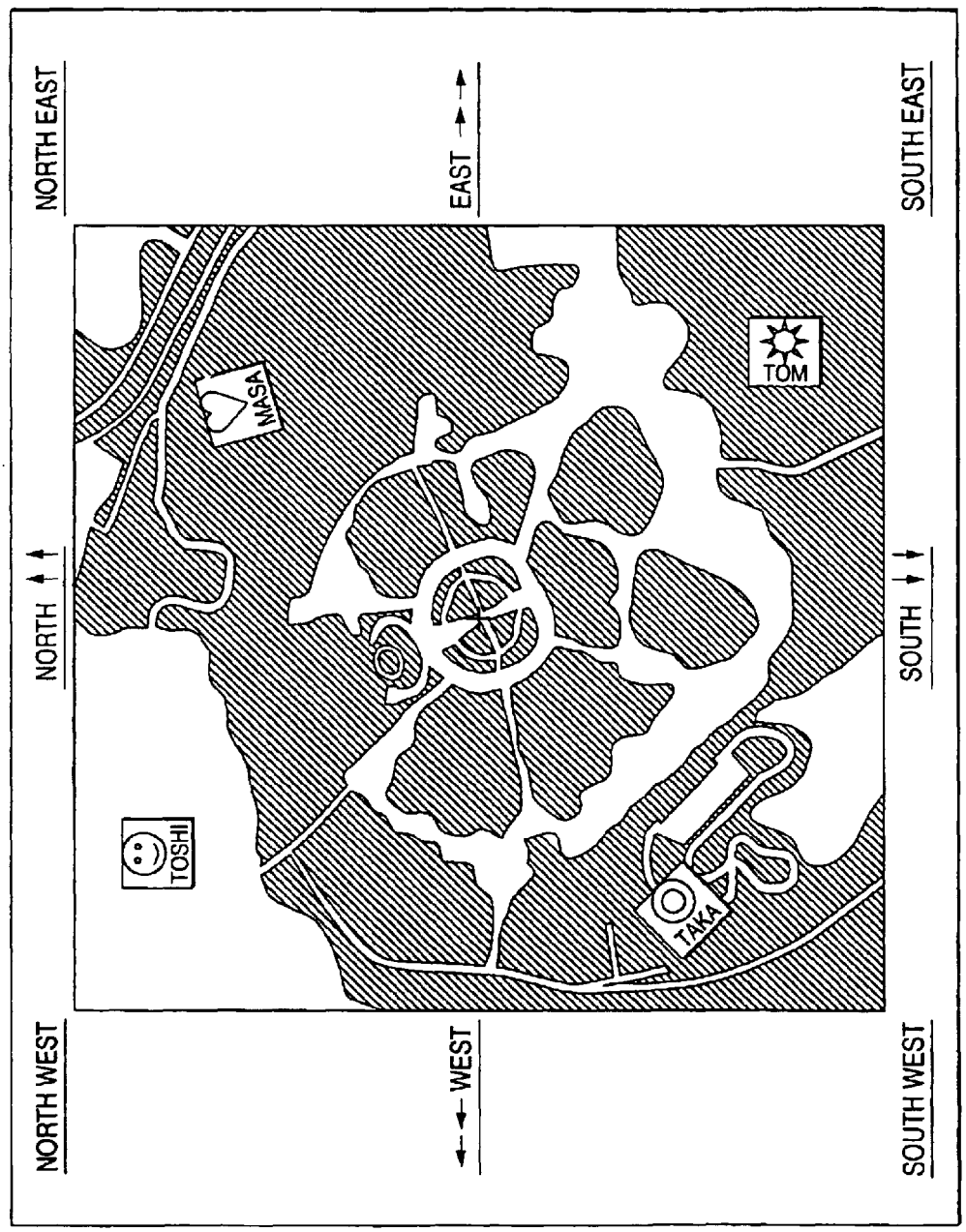
FIG. 10 is an explanatory diagram for explaining a display example displayed on a display unit of the portable telephone apparatus according to the first embodiment of the present invention, indicated in FIG. 2.

Next, based upon the icon data set with respect to the specific individual, and the respective data as to the latitude, the longitude, and the azimuth, which correspond to the positional information of the portable telephone apparatus owned by this specific individual, such an icon character corresponding to the above-described icon code is superimposed on the downloaded map as a position of this individual, and then, the superimposed icon character is displayed on the display unit 52 as indicated in FIG. 10 (step 301).

At this time, the azimuth of each of these specific individuals which constitute the communication counter parties is displayed by using an inclination angle of the icon character on the map (step 302).

In accordance with the portable telephone apparatus of the first embodiment mode of the present invention, this portable telephone apparatus is constituted by: the input unit 48 for inputting the various sorts of data which contain the data used to specify the specific individual in correspondence with the arbitrary icon data and the data used to specify the portable telephone apparatus owned by the specific individual; the storage RAM 44 including the memory table for storing thereinto, in correspondence with the arbitrary icon data, the data used to specify the specific individual the data used to specify the portable telephone apparatus owned by the specific individual, and the positional information of the portable telephone apparatus; the display unit 52 for displaying thereon the various sorts of data; and the CPU 40 for executing the control operation in such a manner that while the CPU 40 accesses a portable telephone apparatus corresponding to the arbitrary icon data, the CPU 40 downloads the positional information of the portable telephone apparatus so as to automatically update the storage content of the memory table, and the CPU 40 superimposes the icon data as the position of the specific individual on the map displayed on the display unit 52 based upon the positional information of the portable telephone apparatus which is owned by the specific individual corresponding to the arbitrary icon data in the automatically updated memory table in order to display thereon the icon data superimposed on the map. Therefore, the positional information of the plural portable telephone apparatus can be displayed in such a manner that these can be discriminated by employing the arbitrary icon figures (icon characters) which have been previously registered.

According to the portable telephone apparatus, since the arbitrary icon figures can be set to be allocated to such specific individuals as the own friends and the own children, the positions of the plural communication counter parties can be easily grasped.

In accordance with the portable telephone apparatus according to the first embodiment of the present invention, the telephone calling process operation is carried out in such a manner that when the specific icon data displayed on the display screen of the display unit is selected, the CPU 40 reads out such a telephone number corresponding to the selected icon data, stored in the memory table. Therefore, the portable telephone apparatus can issue the telephone call with respect to such a portable telephone apparatus which is registered in correspondence with this icon data, by selecting the icon data which is displayed, in the superimposing manner, on the map displayed on the display screen of the display unit.

In accordance with the portable telephone apparatus according to the first embodiment of the present invention, since the map information is not required to be stored in the storage device of the portable telephone apparatus, there is such an effect that a storage device having a large storage capacity is not required.

In the first embodiment, the electric compass module 54 is provided in the portable telephone apparatus 1 for detecting azimuth. However, the electric compass module 54 may not be provided. In this case, the positional information is constituted by longitude and latitude of the portable telephone apparatus 1 without the azimuth thereof.

In incidentally, in the first embodiment of the present invention, the azimuth is detected by employing the electric compass module 54, however, the azimuth detector is not limited to the electric compass module. For example, the azimuth of the specific individual may be obtained by periodically acquiring the positional information from the GPS, and calculating traveling direction of the specific individual who owns the telephone apparatus based on the acquired positional information, so that the icon displayed on the display screen is oriented according to the calculated traveling direction.

Second Embodiment

A second embodiment of the present invention will be described with reference to FIGS. 1, 3 11 through 18. The parts which are same as in the first embodiment will be denoted with the same reference numerals to omit their explanation. FIG. 1 represents a structure of a mobile communication system according to the second embodiment of the present invention as same as in the first embodiment.

Figure 11:
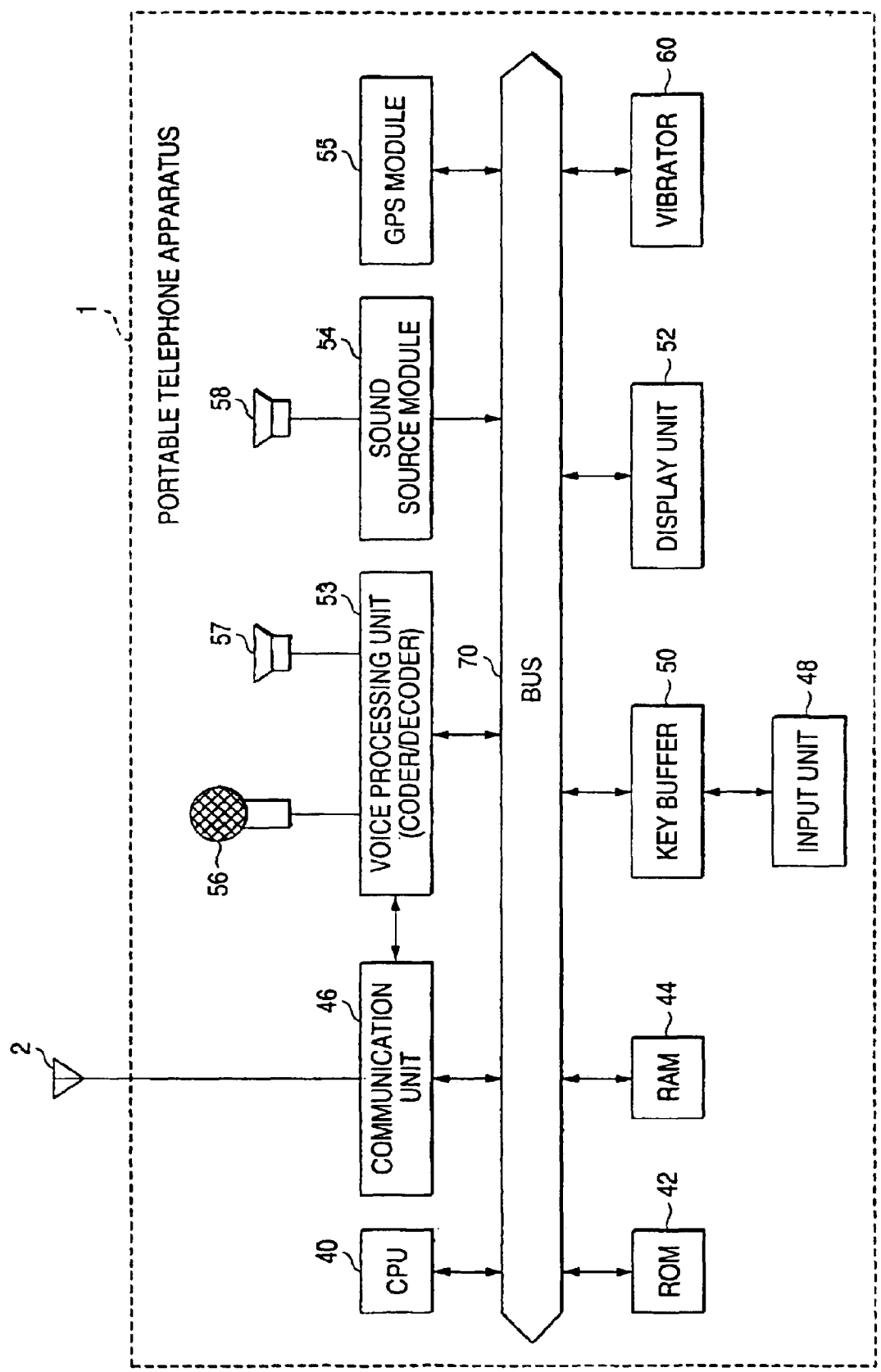
FIG. 11 is a block diagram for showing an arrangement of a portable telephone apparatus according to a second embodiment of the present invention.

Next, FIG. 11 shows an electric arrangement of a portable telephone apparatus 1 provided as any one of the mobile stations 10-1, 10-2, 10-3, - - - , shown in FIG. 1. In this drawing, the portable telephone apparatus 1 includes a CPU (Central Processing Unit) 40, a ROM (Read-Only Memory) 42, a RAM (Random Access Memory) 44, a communication unit 46, an input unit 48, a key buffer 50, and a display unit 52. The CPU 40 executes both a telephone function program, and other programs so as to control various units of the portable telephone apparatus 1. The ROM 42 previously stores thereinto various sorts of programs, and fixed data such as musical piece data. The RAM 44 is a readable/writable storage element. The communication unit 46 transmits and receives data via an antenna 2 to and from an externally provided communication appliance. The input unit 48 is provided with various sorts of keys such as a ten-numeral entry key. The key buffer 50 temporarily stores thereinto key setting data entered from the input unit 48. The display unit 52 displays thereon various sorts of data.

In this ROM 42, these items are stored: various sorts of telephone function programs and a control program, which are executed by the CPU 40 during transmission operation and/or during reception operation; musical piece data which is preset in order to notify a telephone call; icon data indicative of icon figures (icon characters) which are used to display positional information of individuals which constitute owners of portable telephone apparatus corresponding to communication counter parties; and other various sorts of fixed data. This ROM 42 previously stores thereinto a distance/(latitude/longitude) displacement angle table (see FIG. 16). The distance/displacement angle table contains arc distances "RE" with respect to longitude displacement angles, and arc distance "RN" with respect to latitude displacement angles at each of latitude positions on the earth.

A positional information table (see FIG. 15) is set to the RAM 44 and stores data (for example, name) used to specify a specific individual in correspondence with arbitrary icon data; data (for example, telephone number) for specifying a portable telephone apparatus owned by this specific individual; target position data (target latitude, target longitude) of this portable telephone apparatus; and target distance data for designating a target range, this target position being employed as a reference. An arbitrary user setting data storage area, and a is work area of the CPU 40 are set to this RAM 44. This positional information table contains present positional information (present latitude and present longitude) which indicates a present position of this portable telephone apparatus.

The communication unit 46 has a function capable of demodulating a signal received by the antenna 2, and another function capable of modulating a signal to be transmitted and for transmitting the modulated signal.

The input unit 48 provided on a main body 1A of the portable telephone apparatus 1 is equipped as inn the first embodiment as shown in FIG. 3.

The display unit 52 displays thereon map information which is downloaded from the GPS base stations 20-1, 20-2, - - - , in the portable telephone apparatus 1; icon data functioning as positional information indicative of a position of a specific individual who owns a portable telephone apparatus; a figure indicative of a target range which is set based upon a target position; character information of a document which is formed when an electronic mail is transmitted; various sorts of data which contain contents of various sorts of menus; and furthermore, detailed contents thereof.

The portable telephone apparatus 1 is equipped with a voice processing unit (CODER/DECODER) 53, a sound source module 154, a GPS module 55, a microphone 56, a telephone communication receiving speaker 57, a telephone call receiving speaker 158, and a vibrator 60.

The voice processing unit 53 is constituted by a coding unit (CODER), and a decoding unit (DECODER). The voice processing unit 53 decodes a voice (speech) signal which is demodulated by the communication unit 46 so as to output the decoded voice signal to the telephone communication receiving speaker 57. The voice processing unit 53 compresses and codes a voice signal for a telephone communication transmitting purpose, which is entered from the microphone 56, and then, outputs the compressed/coded voice signal to the communication unit 46. When a telephone call is received, or in such a case that a portable telephone apparatus 1 owned by a communication counter party approaches a target position set by the own station, musical piece data is read out from the ROM 42, and the sound source module 154 is driven. As a result, either a telephone call receiving melody or a musical piece is reproduced by the telephone call receiving speaker 158. This musical piece may function as notification sound for notifying such a fact that the portable telephone apparatus 1 of the communication counter party approaches the above-explained target position.

The GPS module 55 receives electromagnetic waves transmitted from a plurality of satellites every time predetermined time has passed, and then, transmits these raw data (unprocessed data) to a GPS base station, and receives a result of measuring calculations from the GPS base station (in the case of E-GPS system).

The CPU 40, the ROM 42, the RAM 44, the communication unit 46, the input unit 48 via the key buffer 50, the display unit 52, the voice processing unit 53, the sound source module 154, the GPS module 55, and the vibrator 60 are connected to a bus 70 so as to communicate each other.

In this case, the CPU 40 corresponds to a controller of the present invention, the RAM 44 corresponds to a first storage unit of the present invention the ROM 42 corresponds to a second storage unit of the present invention, the sound source module 154 corresponds to a musical piece reproducing unit of the present invention, the input unit 48 corresponds to an input unit of the present invention, and the display unit 52 corresponds to a display unit of the present invention.

Figure 12:
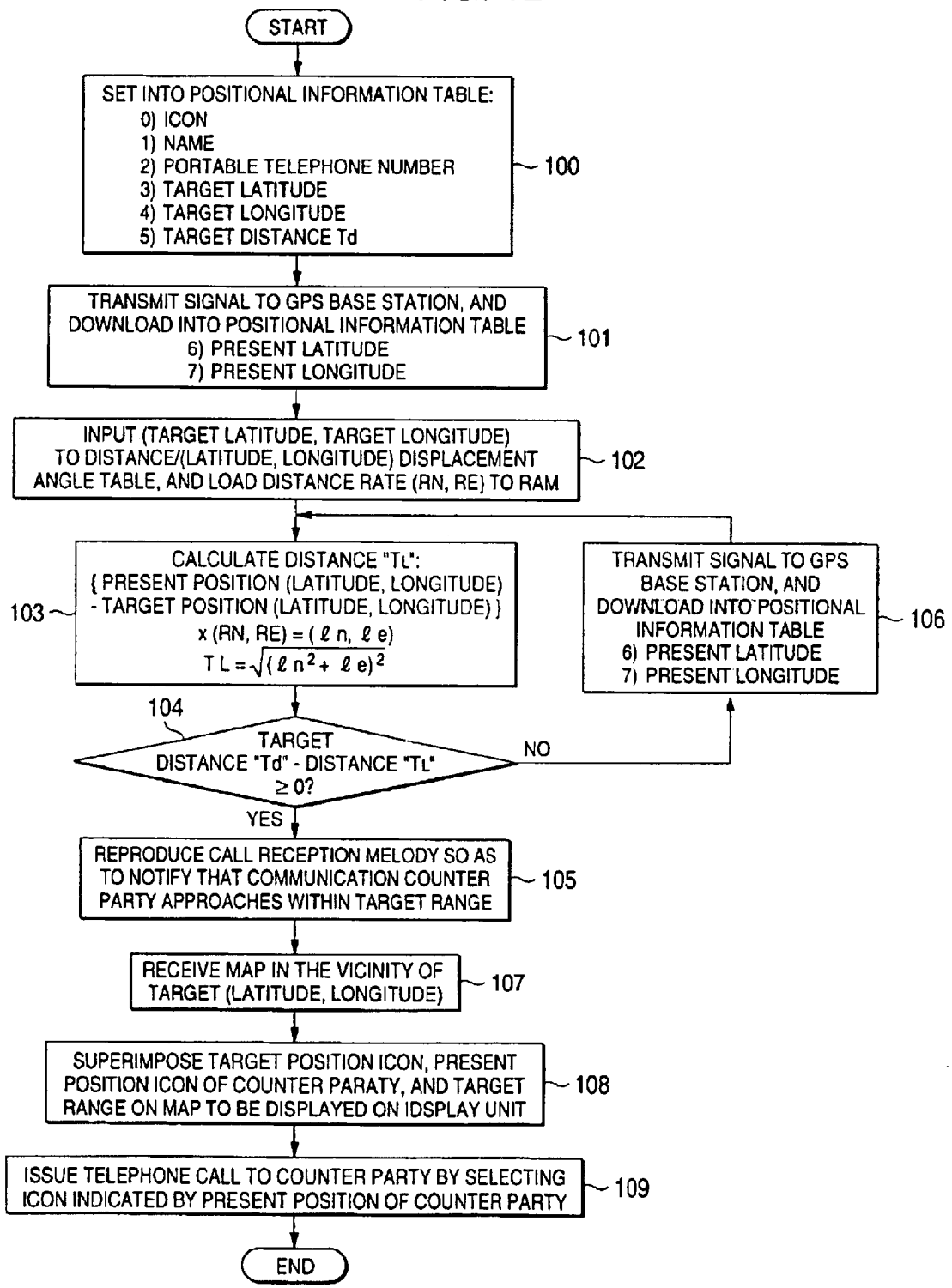
FIG. 12 is a flow chart for indicating a control operation of the portable telephone apparatus according to the second embodiment of the present invention, shown in FIG. 11.

Next, operations of the portable telephone apparatus 1 according to the second embodiment of the present invention, shown in FIG. 11, will now be described with reference to flow charts of FIG. 12 and FIG. 13. In the flow chart of FIG. 12, icon data indicative of icon characters are read out from the ROM 42 by way of a key operation by the input unit 48, and then, this read icon data are displayed on the display unit 52 under control of the CPU 40 at a step 100. Then, such data used to identify a specific individual who owns the portable telephone apparatus 1 with respect to the respective icon characters are set to icon characters (indicated in FIG. 6) which are displayed in correspondence with icon codes, and then, the set icon character/data are stored into specific memory areas of the RAM 44 under control of the CPU 40. The above-explained specific data, for instance, names and nick names are set by way of a key operation of the input unit 48. In FIG. 14, it is so assumed that the icon codes designate an icon 1, an icon 2, an icon 3, - - - , and an icon 10.

At this step 100, the below-mentioned respective data are entered by operating keys of the input unit 48 under control of the CPU 40, namely a name functioning as the data for specifying the specific individual corresponding to the icon data; a telephone number functioning as data for specifying the portable telephone apparatus owned by this specified individual; a target distance "Td" used to designate a target range, in which target latitude, target longitude, and a target position are employed as a reference, which correspond to positional information of such a target position. This target position constitutes a reference used to judge a traveling condition of a portable telephone apparatus owned by a communication counter party. These data are stored into a positional information table of the RAM 44 as indicated in FIG. 15.

Next, the CPU 40 transmits a signal via a GPS base station to a communication counter party station, and downloads the respective data of both present latitude and present longitude to the positional information table of the RAM 44 (step 101). These data are equal to positional information indicative of a present position of a portable telephone apparatus owned by a telephone communication counter party.

The CPU 40 calculates both an arc distance "RE" at a longitude displacement angle in the vicinity of target longitude, and an arc distance "RN" at a latitude displacement angle in the vicinity of target latitude from the distance/(latitude and longitude) displacement angle table stored in the ROM 42 based upon the respective data of both the target latitude and the target longitude corresponding to the target positional information.

Figures 16, 17:
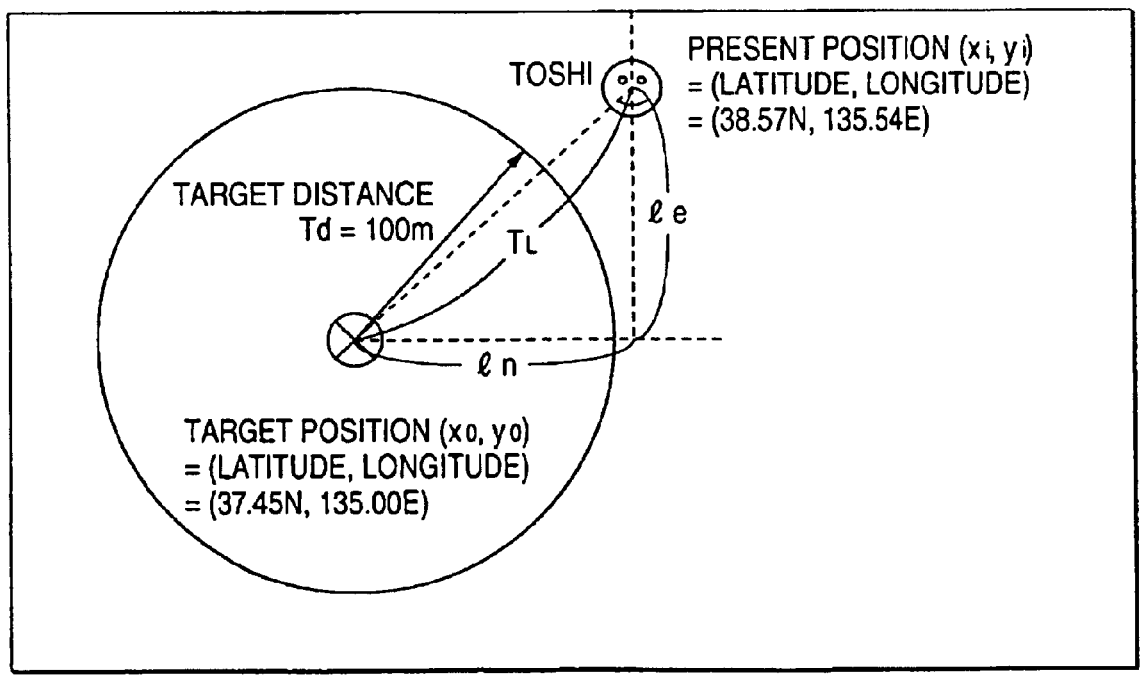
FIG. 16 is an explanatory diagram for indicating an example of a distance/(latitude/longitude) displacement angle table stored in a ROM of the portable telephone apparatus according to the second embodiment of the present invention, shown in FIG. 11.
FIG. 17 is an explanatory diagram for indicating a calculation example of a distance between a target position and a present position of a portable telephone apparatus owned by a communication counter party.
Figure 18:
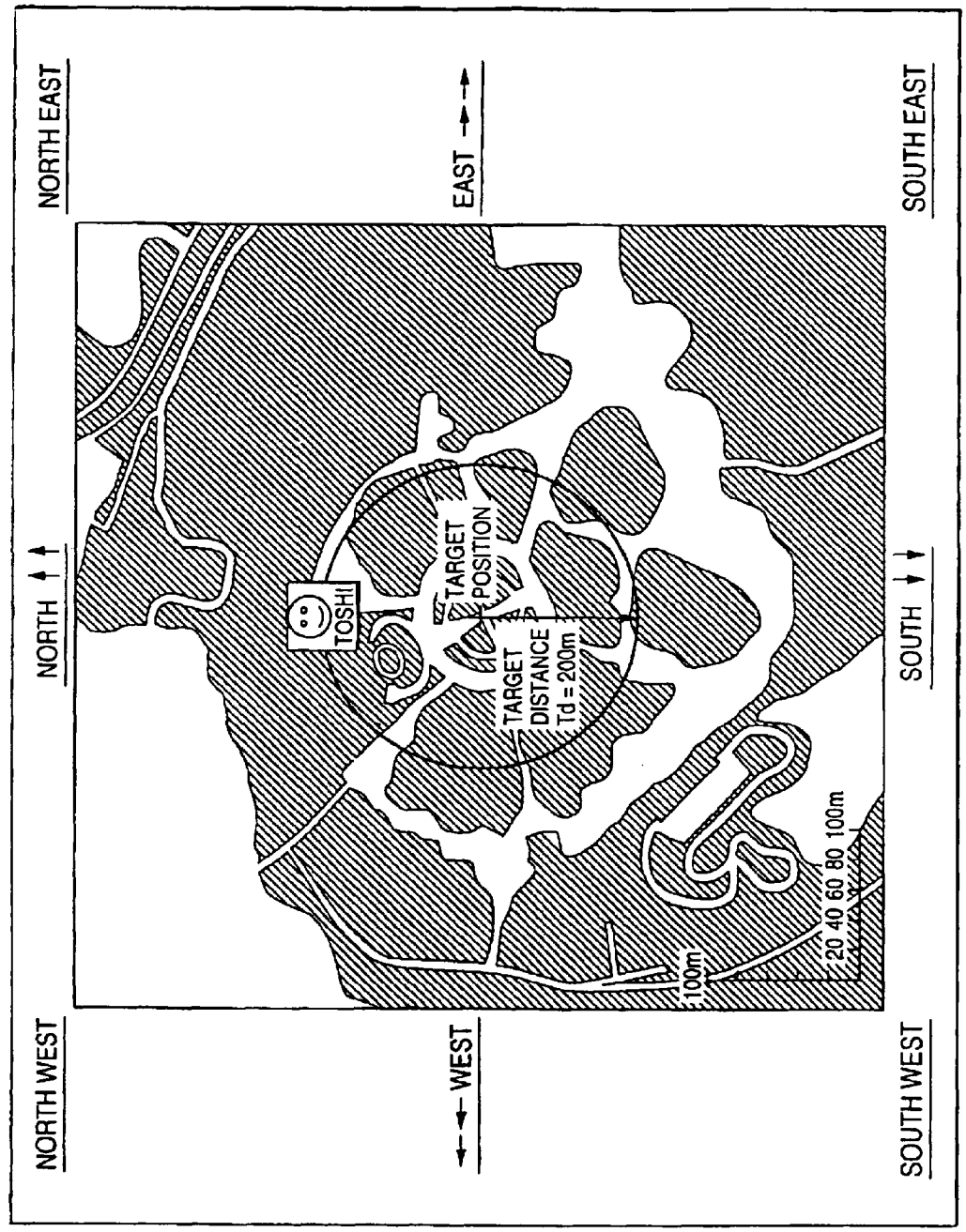
FIG. 18 is an explanatory diagram for explaining a display example displayed on a display unit of the portable telephone apparatus according to the second embodiment of the present invention, indicated in FIG. 11.

Next, the CPU 40 calculates a distance "TL" between the target position and the present position of the portable telephone apparatus owned by the communication counter party (step 403). As shown in FIG. 17, assuming now that the latitude and longitude of the target position are defined as (X0, Y0), and both the present latitude and the present longitude indicative of the present position of the portable telephone apparatus owned by the communication counter party are defined as (Xi, Yi), and further, assuming that a distance coordinate at the present position of the portable telephone apparatus owned by the communication counter party is defined as (In, Ie) when the target position is defined as an origin, $In=(Xi-X0)*RN$, and $Ie=(Yi-Y0)*RE$ As a result, the distance TL is calculated as follows:

$TL=(In^2+Ie^2)^{1/2}$.

A calculation example of the distance TL will now be explained. As shown in FIG. 17, the present position (Xi, Yi) of the portable telephone apparatus 1 owned by a specific individual "Toshi" indicated by an icon character may be calculated with reference to the positional information table of the RAM 44 as follows:

$Xi=38.57N$, and $Yi=135.54E$.

The target position (X0, Y0) of this portable telephone apparatus 1 may be calculated as follows:

$X0=37.45N$, and $Y0=135.00E$.

Next, the CPU 40 calculates both the arc distance "RE" at the longitude displacement angle in the vicinity of the target longitude, and the arc distance "RN" at the latitude displacement angle in the vicinity of the target latitude from the distance/(latitude/longitude) displacement angle table. In this case, 40 degrees are selected as the target latitude from the distance/(latitude/longitude) displacement table shown in FIG. 16, and then, the arc distances are obtained as follows:

$RE=237.2$ m/10 seconds, and $RN=308.4$ m/10 seconds.

As a consequence, since the distance coordinate (In, Ie) is equal to:
$In=(Xi-X0)*RN=(38.57N-37.45N)\times308.4$ m/sec= 2220.48 m; and $Ie=(Yi-Y0)*RE=(135.54E-135.00E)\times237.2$ m/10 seconds=1280.88 m, the distance "TL" becomes:

$(In^2+1e^2)^{1/2}=(2220.48^2+1279.88^2)^{1/2}=2563.4$ m.

Next, at a step 104, the CPU 40 judges whether or not the target distance "Td" is equal to, or longer than the distance "TL." In other words, the CPU 40 judges whether or not the portable telephone apparatus owned by the specific individual "Toshi" corresponding to the communication counter party, namely the specific individual "Toshi" approaches the target range in which the target position is used as the reference. In the case that the target distance Td is set to Td=100 m, the CPU 40 judges that the target distance "Td" is shorter than the distance "TL" (TL=2563.4 m) in the above-described concrete example. At the step 104, when the CPU 40 judges that the target distance "Td" is shorter than the target "TL", namely the CPU 40 judges that the specific individual "Toshi" does not approach within the target range, the CPU 40 again transmits a signal via the GPS base station after a predetermined time interval has elapsed, and downloads present positional information of the communication counter party ("Toshi" in this example), namely respective data of both present latitude and present longitude into the positional information table of the RAM 44, and updates the respective data. Then, the process operation is returned to the step 103.

On the other hand, in the case that the CPU 40 judges that the target distance "Td" is longer than, or equal to the distance "TL", the CPU 40 drives the sound source module 154 so as to produce a musical piece and to notify such a fact that the specific individual "Toshi", is reached within a preset target range. Then, the process operation is advanced to a step 107. Next, the CPU 40 transmits a signal to a GPS station, and downloads a map in the vicinity of the target position from the GPS base station.

Incidentally, as shown in FIG. 19, a various kinds of telephone call receiving melodies corresponding to the each specific individual may be set on the positional information table set on the RAM 44. In this case, when it is determined that the specific individual is located within the target range, the melody corresponding to the specific individual can be reproduced. Therefore, by distinguishing the reproduced melody, it can be distinguish that who is located within the target range.

At a step 108, the CPU 40 causes the display unit 52 to display thereon a target position icon indicative of the target position, an icon character representative of the present position of the communication counter party, and an indication representative of the target range in such a manner that these target position icon, icon character, and indication are superimposed on the map which is downloaded from the GPS base station.

Since an icon character (icon data), on the display screen of the display unit 52, representative of a present position of a communication counter party is selected by manipulating the cursor key of the input unit 48, a telephone call can be sent to a portable telephone apparatus owned by the communication counter party (step 109).

Figure 13:
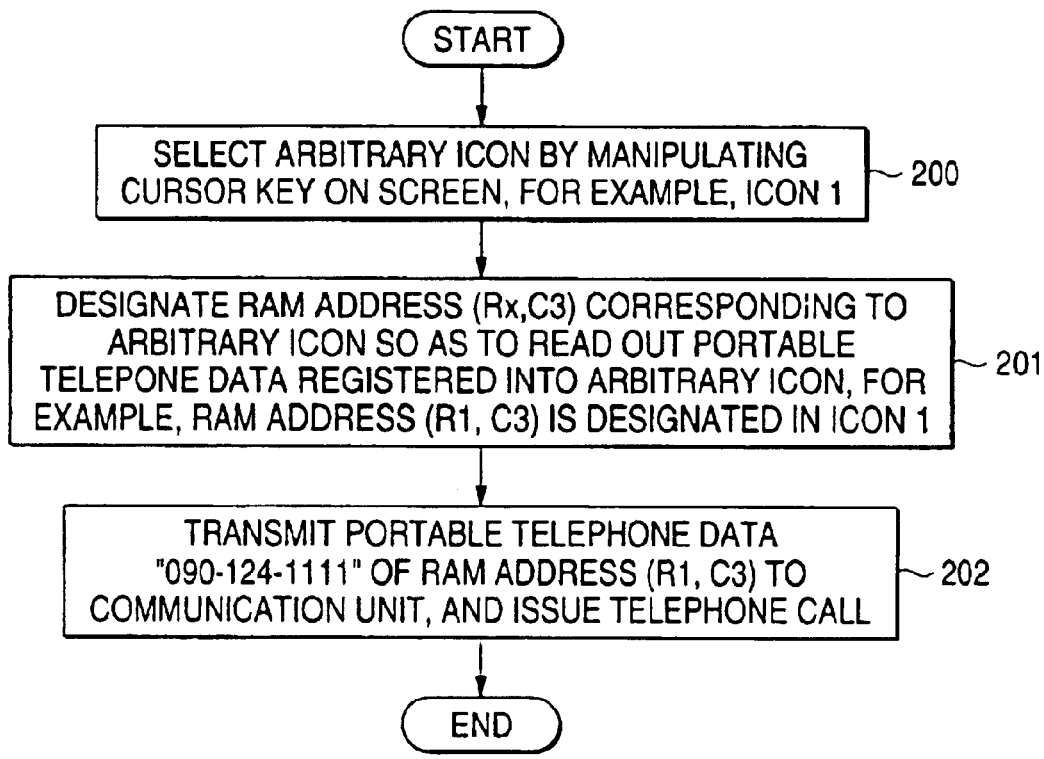
FIG. 13 is a flow chart for indicating a content of a call issuing process operation executed by a CPU employed in the portable telephone apparatus according to the second embodiment of the present invention, shown in FIG. 11.
Figure 14:
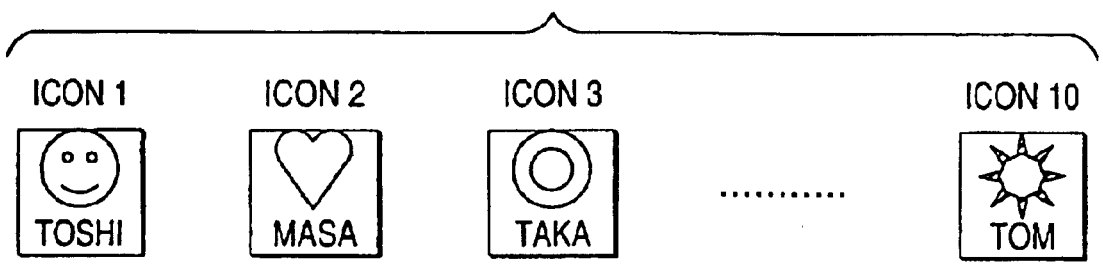
FIG. 14 is an explanatory diagram for explaining an example of setting both icon data codes and icon characters.

Next, referring now to a flow chart of FIG. 13, a description is made of such a call issuing process operation that while an arbitrary icon character is selected from a plurality of icon characters displayed on the display screen of the display unit 52, a telephone call is sent to a portable telephone apparatus which is owned by a specific individual corresponding to the selected icon character. In this drawing, for example, it is so assumed that an icon character corresponding to the icon data code shown in FIG. 14 is displayed on the display screen of the display unit 25. In this case, an arbitrary icon character is selected by manipulating the cursor key of the input unit 48 (step 200). For example, it is so assumed that such an icon character corresponding to the icon data code of "icon 1" is selected.

Subsequently, a RAM address (RX, C3) corresponding to the selected arbitrary icon data code is designated, and data as to a telephone number (portable telephone number) of the relevant portable telephone apparatus is read out from the positional information table of the RAM 44 shown in FIG. 15 (step 201). In this case, since the icon data code is "icon 1", a RAM address to be designated becomes (R1, C3). Then, at a step 202, the CPU 40 sends out telephone number data "090-1234-1111" of the relevant portable telephone apparatus based upon the RAM address (R1, C3) in the positional information table of the RAM 44 to the communication unit 46, and then, issues a telephone call.

In accordance with the portable telephone apparatus according to the second embodiment of the present invention, while the data used to specify the portable telephone apparatus which constitutes the communication counter station whose position is wanted to be detected is previously registered, in the case that the portable telephone apparatus which constitutes the communication counter station approaches the target position set to the own station, such a fact is notified, and the positional information of the communication counter station is displayed in such a manner that the positional information of the communication counter station is superimposed on the map in the vicinity of the target position. Therefore, it is possible to grasp the traveling conditions of the portable telephone apparatus of the communication counter party.

In accordance with the portable telephone apparatus according to the second embodiment of the present invention, the CPU 40 executes the control operations in such a manner that while the controller acquires the positional information indicative of the present position of the portable telephone apparatus of the communication counter station, the CPU 40 updates the present positional information of the positional information table based upon the acquired positional information, and calculates the distance "TL" between the present position of the communication counter station and the target position from the acquired present positional information, the target position data, and the distance/(latitude/longitude) displacement angle data based upon the arc distance "RE" with respect to the longitude displacement angle and the arc distance "RN" with respect to the latitude displacement angle at the latitude in the vicinity of the target position; the CPU 40 compares the distance "TL" with the distance "Td" indicated by the target distance data, and drives the musical piece reproducing unit at such a time instant when the calculated distance "TL" is shorter than, or equal to the distance "Td" indicative of the target distance data. Therefore, the CPU 40 can grasp whether or not the portable telephone apparatus of the communication counter party approaches within a predetermined distance range from the target value.

In accordance with the portable telephone apparatus according to the second embodiment of the present invention, the CPU 40 controls the display unit 52 to display the positional information of the communication counter station in such a manner that the positional information is superimposed on the map in vicinity of the target position. As a consequence, the CPU 40 can concretely grasp the traveling conditions of the portable telephone apparatus owned by the communication counter party.

It should be noted that the invention is not limited to the above-described embodiments. For example, the present can be applied not only to the portable telephone apparatus but also to personal handy phone system (PHS), personal digital assistance (PDA) and the like. In addition, the invention is also applicable to cases where items based on the various embodiments described above may be used in combination.

In accordance with the invention, the positional information of the plural portable telephone apparatuses can be displayed in such a manner that these can be discriminated by employing the arbitrary icon figures which have been previously registered.

Since the arbitrary icon figures can be set to be allocated to such specific individuals as the own friends and the own children, the positions of the plural communication counter parties can be easily grasped.

In accordance with the invention, the controller executes the telephone calling process operation in such a manner that when the specific icon data displayed on the display screen of the display unit is selected, the controller reads out such a telephone number corresponding to the selected icon data, stored in the memory table. As a result, the portable telephone apparatus can issue the telephone call with respect to such a portable telephone apparatus which is registered in correspondence with this icon data, since the icon data is selected which is displayed on the map displayed on the display screen of the display unit in the superimposing manner.

In accordance with the invention, since the map information is not required to be stored in the storage device of the portable telephone apparatus, there is such an effect that a storage device having a large storage capacity is not required.

In accordance with the present invention, the data used to specify the portable telephone apparatus which constitutes the communication counter station whose position is wanted to be detected is previously registered. In the case that the portable telephone apparatus which constitutes the communication counter station approaches the target position set to the own station, such a fact is notified, and the positional information of the communication counter station is displayed in such a manner that the positional information of the communication counter station is superimposed on the map in the vicinity of the target position. Therefore, the traveling conditions of the portable telephone apparatus owned by the communication counter party can be grasped.

In accordance with the present invention, the portable telephone apparatus is controlled by the controller in the following manner: The controller acquires the positional information indicative of the present position of the portable telephone apparatus of the communication counter station. The controller updates the present positional information of the positional information table based upon the acquired positional information, and calculates the distance "TL" between the present position of the communication counter station and the target position from the acquired present positional information, the target position data, and the distance/(latitude/longitude) displacement angle data based upon the arc distance "RE" with respect to the longitude displacement angle and the arc distance "RN" with respect to the latitude displacement angle at the latitude in the vicinity of the target position. The controller compares the distance "TL" with the distance "Td" indicated by the target distance data, and drives the musical piece reproducing unit at such a time instant when the calculated distance "TL" is shorter than, or equal to the distance "Td" indicative of the target distance data. Therefore, the portable telephone apparatus can grasp whether or not the portable telephone apparatus owned by the communication counter party approaches within the predetermined distance range from the target value.

In accordance with the present invention, since the controller controls the display unit to display the positional information of the communication counter station in such a manner that the positional information is superimposed on the map in vicinity of the target position, the traveling conditions of the portable telephone apparatus owned by the communication counter party can be concretely grasped.

What is claimed is:

1. A portable communication terminal capable of detecting a position of the portable communication terminal by using a Global Positioning System, the portable communication terminal comprising:

an input unit which inputs first data for specifying a specific individual and second data for specifying an another portable communication terminal owned by the specific individual in correspondence with icon data;

a storage unit which stores the inputted first and second data and positional information of the another portable communication terminal owned by the specific individual in correspondence with the icon data;

an azimuth measuring unit for measuring an azimuth of the specific individual;

a display;

a controller which accesses, via a base station, the another portable communication terminal corresponding to the icon data, downloads the positional information of the another portable communication terminal corresponding to the icon data, automatically updates the positional information of the another portable communication terminal corresponding to the icon data which is stored in the storage unit, and displays an icon based on the icon data so as to be superposed on a map displayed on the display;

wherein the map displayed on the display is provided based on map information downloaded through the base station according to the downloaded positional information of the another communication terminal; and wherein an inclination angle of the icon character on the map is controlled based on the measured azimuth.

2. The portable communication terminal according to claim 1, wherein the portable communication terminal is a portable telephone apparatus, the second data is a telephone number, and when the icon displayed on the display is selected, the controller reads out the telephone number corresponding to the selected icon data from the storage unit and executes a telephone calling process operation based on the read telephone number.

3. The portable communication terminal according to claim 9, further comprising:

a detector which detects whether or not the position of the portable communication terminal corresponding to icon data is located within a predetermined range previously set by receiving the positional information indicating a position of the portable communication terminal corresponding to the icon data; and a reproducing unit which reads out the musical data stored in the storage unit and reproduces music based on the read musical data when the detector detects that the portable communication terminal corresponding to the icon data is located within the predetermined range.

4. The portable communication terminal according to claim 3, wherein the icons registered in the register unit are different each other for every corresponding other portable communication terminal.

5. The portable communication terminal according to claim 3, wherein the portable communication terminal is a portable telephone apparatus, and the second data, input by unit, for specifying the portable telephone apparatus is a telephone number of the portable telephone apparatus.

6. The portable communication terminal according to claim 3, wherein the reproducing unit is capable of reproducing a plurality of the musical data which are different from each other for every corresponding other portable communication terminal.

7. The portable communication terminal according to claim 3, wherein the predetermined range is set as a distance from a predetermined target position.

8. A method of controlling a portable communication terminal capable of detecting a position of the portable communication terminal by using a Global Positioning System, the method comprising the steps of:

inputting first data for specifying a specific individual and second data for specifying an another portable communication terminal owned by the specific individual in correspondence with icon data;

storing the inputted first and second data and positional information of the another portable communication terminal owned by the specific individual in correspondence with the icon data;

measuring an azimuth of the specific individual;

accessing, via a base station, the another portable communication terminal corresponding to the icon data;

downloading the positional information of the another portable communication terminal corresponding to the icon data;

automatically updating the positional information of the another portable communication terminal corresponding to the stored icon data; and displaying an icon based on the icon data so as to be superposed on a map displayed on a display;

wherein the map displayed on the display is provided based on map information downloaded through the base station according to the downloaded positional information of the another communication terminal; and wherein an inclination angle of the icon character on the map is controlled based on the measured azimuth.

9. The method according to claim 8 further comprising the steps of:

detecting whether or not the position of the another portable communication terminal corresponding to the icon data is located within a predetermined range previously set based on the received positional information; and reading out the musical data and reproducing music based on the read musical data when the another portable communication terminal corresponding to the icon data is located within the predetermined range.

10. A computer readable recording medium including instructions, wherein the instruction, when executed by a computer provided in a portable communication terminal detecting a position of the portable communication terminal by using a Global Positioning System, cause the portable communication terminal to perform the steps of:

inputting first data for specifying a specific individual and second data for specifying an another portable communication terminal owned by the specific individual in correspondence with icon data;

storing the inputted first and second data and positional information of the another portable communication terminal owned by the specific individual in correspondence with the icon data;

measuring an azimuth of the specific individual:

accessing, via a base station, the another portable communication terminal corresponding to the icon data;

downloading the positional information of the another portable communication terminal corresponding to the icon data;

automatically updating the positional information of the another portable communication terminal corresponding to the stored icon data; and displaying an icon based on the icon data so as to be superposed on a map displayed on a display;

wherein the map displayed on the display is provided based on map information downloaded through the base station according to the downloaded positional information of the another communication terminal; and wherein an inclination angle of the icon character on the map is controlled based on the measured azimuth.

11. The computer readable recording medium including instructions according to claim 10 which causes the another portable communication terminal to further perform the steps of:

deetecting whether of not the position of the another portable communication terminal corresponding to the icon data is located within a predetermined range previously set based on the received positional information; and reading out the musical data and reproducing music based on the read musical data when the another portable communication terminal corresponding to the icon data is located within the predetermined range.

12. A portable communication terminal capable of detecting a position of the portable communication terminal by using a Global Positioning System, the portable communication terminal comprising:

an input unit which inputs first data for specifying a specific individual and second data for specifying an another portable communication terminal owned by the specific individual in correspondence with icon data;

a storage unit which stores the inputted first and second data and positional information of the another portable communication terminal owned by the specific individual in correspondence with the icon data;

a display;

a controller which accesses the another portable communication terminal corresponding to the icon data, downloads the positional information of the another portable communication terminal corresponding to the icon data, automatically updates the positional information of the another portable communication terminal corresponding to the icon data which is stored in the storage unit, and displays an icon based on the icon data so as to be superposed on a man displayed on the display; and further comprising: a musical piece reproducing unit which reproduces a musical piece, wherein the input unit inputs target position data, and target distanced data for designating a target range by using the target position as a reference;

the storage unit includes:

a first storage unit including a positional information table which stores thereinto the first data, the second data, the target position data, the target distance data, and present positional information indicative of a present position of the portable telephone apparatus, and a second storage unit which stores thereinto a distance/displacement angle table, various sorts of programs, and fixed data, the distance/displacement angle table including an arc distance with respect to a longitude displacement angle and an arc distance with respect to a latitude displacement angle at each of latitude positions, and the controller acquires positional information indicative of a present position of the another portable telephone apparatus as a communication counter station, updates the present positional information of the positional information table based upon the acquired positional information, and calculates a first distance between the present position of the communication counter station and a target position from the acquired present positional information, the target position data, and the distance/displacement angle data based upon the arc distance with respect to the longitude displacement angle and the arc distance with respect to the latitude displacement angle at latitude in the vicinity of the target position, wherein the controller compares the first distance with a second distance indicated by the target distance data, and drives the musical piece reproducing unit when the calculated first distance is shorter than, or equal to the second distance.

* * * * *